Oct. 23, 1962     B. H. DILLISTONE     3,059,254
RETRIEVING DEVICES FOR SUBMERGED ARTICLES
Filed Jan. 16, 1961
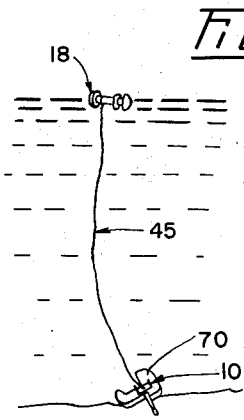
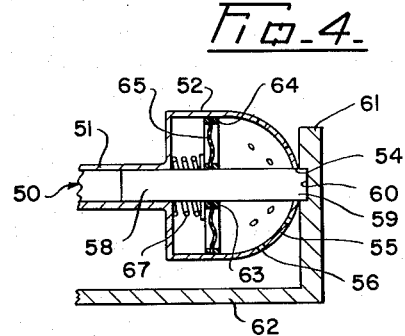
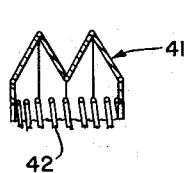
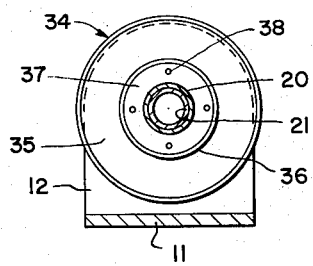
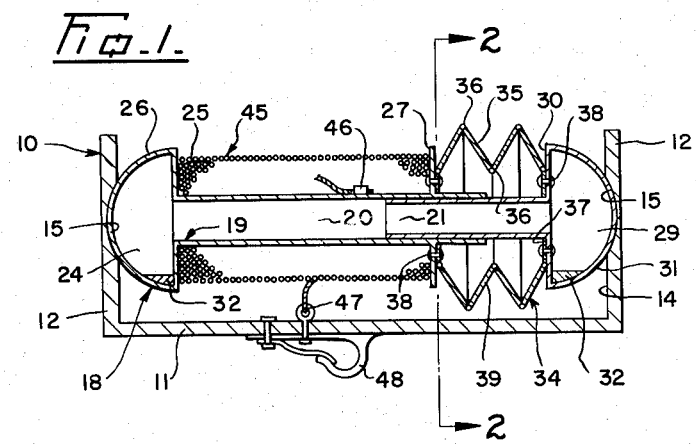
INVENTOR
BRIAN H. DILLISTONE
By Carver and Company
Hugo Ray
Agent

United States Patent Office 3,059,254
Patented Oct. 23, 1962

3,059,254
RETRIEVING DEVICES FOR SUBMERGED
ARTICLES
Brian H. Dillistone, 3850 Epsom Drive, Victoria,
British Columbia, Canada
Filed Jan. 16, 1961, Ser. No. 82,845
3 Claims. (Cl. 9—9)

The objects of the invention are to provide a device which may conveniently be attached to an outboard motor, a fishing rod or other similar article; to provide means whereby, should the article be dropped into deep water, a buoy or float is automatically released from the device to give visual indication of the location of the article and a line is unreeled between the device, attached to the submerged article on the bottom, and the float on the surface, for subsequent use in raising said article.

Referring to the drawings:

FIGURE 1 is a longitudinal sectional view of the invention.

FIGURE 2 is a section taken on the line 2—2 of FIGURE 1.

FIGURE 3 is a section of modified form of the capsule.

FIGURE 4 is a fragmentary view of a modification of the device.

FIGURE 5 is a reduced scale view showing the device in use.

In the drawings like characters of reference indicate corresponding parts in each figure.

The numeral 10 indicates generally a substantially U-shaped holder having a base portion 11 and end portions 12 which are disposed at right angles to said base portion. The opposing faces 14 of the end portions are provided with concave recesses 15, see FIGURE 1 only.

Fitted to the holder 10 is a float 18 having a tubular shaft 19 which is formed by telescopic sleeves 20 and 21. The sleeve 20 is provided at one end with a hollow enlargement 24 having an inner wall 25 and a semi-spherical wall 26. A vertically disposed flange 27 is provided adjacent the other end of the sleeve 20. The tubular sleeve 21 also has an enlargement which is indicated by the numeral 29, and is provided with an inner wall 30 and a semi-spherical wall 31.

Both the enlargements 24 and 29 are fitted with weights 32 which are located near the outer edges of said enlargements. Conveniently the weights may be carried within the enlargements as shown in FIGURE 1 and said weights are aligned to overbalance the float as it rotates about its longitudinal axis.

The float 18 is fitted with pressure capsule 34 having an outer wall made up of a number of angularly disposed plates 35 which are hingedly connected together as at 36. End walls 37 are provided on the capsule and these walls are suitably sealed and secured as at 38 to the opposing faces of the flange 27 and the enlargement wall 30. The construction of the capsule is such that it will collapse in a longitudinal direction in response to external water pressure exerted on the outer wall plates 35. It will be noted that the air pressure within the sealed pressure capsule 34, in the expanded position, is substantially above atmospheric pressure.

As shown in FIGURE 1, the enlargements 24 and 29 are adapted to seat in the recesses 15 in the end portions 12 and the float 18 is supported in the holder by means of the force exerted by the air pressure within the capsule 34.

In the modification shown in FIGURE 3 the device is provided with a capsule 41 which encloses a light coil spring 42. This spring serves to augment the force exerted by the air within the capsule and normally to maintain the telescopic sleeves so that, were the air pressure to be materially reduced, this action would still take place. However, as in the case of the preferred embodiment, the modified capsule is adapted to be collapsed by pressure greater than normal atmospheric.

Wound around the sleeve 20 between the wall 25 and the flange 27 is a long length of cord 45, preferably nylon or the like for optimum lightness and strength. One end of the cord is secured to the sleeve 20 as at 46, and the other end of said cord is fastened to an eye 47 which is carried by the base portion 11 of the holder. Secured to the underside of the portion 11 is a suitable fastening device which may take the form of a spring fitted clasp 48.

The modified device 50 of FIGURE 4 consists of a tubular shaft 51 having at one end, an elongated enlargement 52. An opening 54 is provided in the wall 55 of the enlargement, which wall also has a number of spaced apertures 56. Slidably mounted in the shaft 51 is a plunger 58 having an outer end 59 which projects through the opening 54 and is normally received in a recess 60 formed in the adjacent end wall 61 of the holder 62. The plunger 58 is fitted with a collar 63 and a second collar 64 is secured to the inner periphery of the enlargement 52. A flexible diaphragm 65 is supported in the collars 63 and 64. Interposed between the collar 63 and the end wall 66 of the enlargement is a light spring 67.

The device may be employed, for example, as a safety attachment for an outboard motor such as is shown at 70 in FIGURE 5. The clasp 48 is snapped on to a line or fitting on the motor to secure the device thereto in a position which will not interfere with the normal operation of the motor. If the motor is lost overboard, the motor with the device attached to it, will rapidly sink. However, as a depth is reached at which the hydrostatic pressure compresses the capsule in a longitudinal direction, the tubular shaft 19 is telescoped so that the enlargements 24 and 29 are withdrawn from the recesses 15. This movement releases the float from the holder while the motor with said holder attached thereto, sinks to the bottom. The released float rises to the surface and, in so doing, unreels the cord 45. On the surface the weights 32 tend to keep the float from rotating so that the unused cord remains wound around the sleeve 20 and the float does not drift too far away from the location of the outboard motor 70. When the float is sighted, the cord is used to raise the motor to the surface whereupon the retrieving device is reassembled for future use.

The device 50 also relies upon water pressure to release the float from the holder. Water entering the enlargement 52 through the apertures 56 exerts a pressure on the diaphragm 65 so as to compress the spring 67 and withdraw the plunger end 59 from the recess 60 thus releasing the float from its holder.

What I claim as my invention is:

1. A retrieving device for submerged articles comprising a holder adapted to be attached to an article, said holder having end portions, an endwise extensible float, a pressure sensitive member carried by the float, said member normally extending the float into latching engagement with the end portions, said member having an outer wall formed of hingedly connected plates disposed at an acute angle to one another, said plates being adapted to fold about their hinge connections in response to hydrostatic pressure following submergence whereby to contract the float and release it from latching engagement with the end portions of the holder.

2. A device as claimed in claim 1 wherein the member normally extending the float into latching engagement with the end portions is fitted with a light spring.

3. A retrieving device as claimed in claim 1, wherein the float has an enlargement at each end, said enlargements have semi-spherical end walls and the end portions of the holder have concave recesses in which the semi-spherical end walls are seated.

References Cited in the file of this patent

UNITED STATES PATENTS

| | | | |
|---|---|---|---|
| 2,198,755 | Berndt | | Apr. 30, 1940 |
| 2,490,876 | Lewis et al. | | Dec. 13, 1949 |
| 2,559,918 | Grieb | | July 10, 1951 |
| 2,569,977 | Dickinson | | Oct. 2, 1951 |
| 2,675,568 | King | | Apr. 20, 1954 |
| 2,830,309 | Lawson | | Apr. 15, 1958 |